United States Patent
Courtney et al.

(10) Patent No.: US 6,639,548 B2
(45) Date of Patent: *Oct. 28, 2003

(54) METHOD FOR CREATION OF PLANAR OR COMPLEX WAVEFRONTS IN CLOSE PROXIMITY TO A TRANSMITTER ARRAY

(75) Inventors: Clifton C. Courtney, Cedar Crest, NM (US); Donald E. Voss, P.O. Box 940, Tijeras, NM (US) 87059

(73) Assignee: Donald E. Voss, Albuquerque, NM (US)

(*) Notice: Subject to any disclaimer, the term of this patent is extended or adjusted under 35 U.S.C. 154(b) by 0 days.

This patent is subject to a terminal disclaimer.

(21) Appl. No.: 10/273,472

(22) Filed: Oct. 18, 2002

(65) Prior Publication Data

US 2003/0076256 A1 Apr. 24, 2003

Related U.S. Application Data

(63) Continuation-in-part of application No. 09/861,122, filed on May 21, 2001, now Pat. No. 6,469,658.
(60) Provisional application No. 60/207,684, filed on May 26, 2000.

(51) Int. Cl.[7] ............ G01S 7/40; G01S 13/00; G06F 19/00; G21G 5/00; G01G 9/00
(52) U.S. Cl. .................. 342/169; 342/188; 702/57; 250/492.1; 73/865.6
(58) Field of Search .................. 342/165–174, 342/188; 250/492.1; 73/865.6, 865.9; 702/57–80

(56) References Cited

U.S. PATENT DOCUMENTS

| | | |
|---|---|---|
| 3,719,812 A | 3/1973 | Bishop et al. |
| 5,247,843 A | 8/1993 | Bryan |
| 5,339,087 A | 8/1994 | Minarik |
| 5,719,794 A | 2/1998 | Altshuler et al. |
| 5,721,554 A | 2/1998 | Hall et al. |
| 6,056,780 A | 5/2000 | Aubry et al. |
| 6,236,371 B1 * | 5/2001 | Beck ............... 343/703 |
| 6,333,712 B1 * | 12/2001 | Haugse et al. ....... 342/375 |
| 6,346,909 B1 * | 2/2002 | Johnson et al. ...... 342/169 |
| 6,469,658 B2 * | 10/2002 | Courtney et al. ..... 342/169 |

OTHER PUBLICATIONS

Chapter 4 from Practical Genetic Algorithms by Randy L. Haupt & Sue Ellen Haupt (Wiley Inter–Science).
Genetic Algorithms + Data Structures = Evolution Programs (Third, Revised & Extended Edition by Zbigniew Michalewicz).
Field Computation by Moment Methods/Macmillan Series in Electrical Science by Roger F. Harrington (Ch. 2).

* cited by examiner

*Primary Examiner*—Thomas H. Tarcza
*Assistant Examiner*—Brian K Andrea
(74) *Attorney, Agent, or Firm*—Dennis F. Armijo

(57) ABSTRACT

An apparatus and method for generating an electromagnetic environment in which the free field, plane wave response of electronic systems of an electrically large (greater than several wavelengths in its longest dimension) object, or objects, under test can be measured in the electromagnetic radiating near field of the transmitter array apparatus. The apparatus comprises: (1) one or more transmitting station(s), each station home to an array of radiating elements; (2) a software operating system and computer that controls the electronic circuits of the apparatus and executes an optimizing algorithm based on a Genetic Algorithm to control the radiation of each transmitting station; and (3) mechanical and electrical circuits that enable the apparatus to conduct self calibration and adjustment as required. In operation, the apparatus is placed and distributed about an object under test. With input from an operator, an optimization procedure based on a Genetic Algorithm determines the magnitude and phase of each radiating element, of each transmitting station. The apparatus then creates an electromagnetic environment that couples to sensors through small apertures distributed about the object under test, and causes the electronic behavior of electronic systems of the object under test to mimic their response to a true free field, plane wave environment.

20 Claims, 7 Drawing Sheets

METHOD FOR CREATION OF PLANAR OR COMPLEX WAVEFRONTS IN CLOSE PROXIMITY TO A TRANSMITTER ARRAY

CROSS-REFERENCE TO RELATED APPLICATIONS

This application is a continuation-in-part application No. 09/861,122, filed May 21, 2001, of U.S. Pat. No. 6,469,658 issued on Oct. 22, 2002, entitled "Method for Creation of Planar or Complex Wavefronts in Close Proximity to a Transmitter Array", and also claims priority to Provisional Application, Ser. No. 60/207,684 filed on May 26, 2000 entitled "Pseudo-Plane Wave Generator", the teachings of which are incorporated herein by reference.

BACKGROUND OF THE INVENTION

1. Field of the Invention (Technical Field)

The Pseudo-Plane Wave Generator invention relates to measuring electronic circuit responses of large objects and more particularly to a distributed electronic and mechanical apparatus comprised of one or more stations of a radiating array that can generate an electromagnetic environment suitable for measurement of the circuit response of electrically large objects to free field, plane wave environments within the confines of a volume, like an anechoic chamber, that normally would not permit such a measurement due to the large distances normally associated with the creation of a true plane wave environment. The invention applies to a broad range of applications that utilize wavelike phenomena represented by the linear superposition principle, including, but not limited to sonar, audio, and optics applications.

2. Background Art

To measure the electronic circuit response of large objects (many wavelengths in extent at the frequency of operation) subjected to a free field, transverse electromagnetic (not guided wave), plane wave environment at RF and electromagnetic frequencies, (typically in the 20 MHZ-20 GHz frequency range) one has in the past been required to conduct measurements at outdoor ranges. For electrically small objects a plane wave-like environment can be established with a compact range, and measurements can be made in an electromagnetic anechoic chamber. However, it is difficult, or impossible, within the confines of an anechoic chamber, to test the response and behavior of electronic equipment housed within an electrically large object, and coupled to the plane wave environment via multiple distributed, apertures and/or wire penetrations. Disclosed is a unique way to generate a pseudo-plane wave electromagnetic environment within a small, confined region. Whereas a true plane wave would bathe the region occupied by the object under test (OUT) housing electronic equipment uniformly, the Pseudo-Plane Wave Generator generates an electromagnetic field that approximates a plane wave field only over limited extents of one or more continuous or discontinuous volumes or regions occupied in whole or in part by the OUT. The locations and extents of these regions are specified by an operator, and the Plane Wave Generator's operating system software conducts an optimization utilizing a Genetic Algorithm procedure to determine the amplitude and phase of electrical signals that excite each radiating element of each transmitting station. The resulting electromagnetic environment, being the summation or superposition of all radiating elements of the Plane Wave Generator, will stimulate the sensors of a test object in a manner that mimics its response to a free field, plane wave environment.

U.S. Pat. No. 5,721,554 to Hall, discloses a technique for generating a simulated angle of arrival for testing a multi-wavelength sensor aperture. The device consists of three to five transmitting antennas. The excitation of each radiating antenna is determined via an analytical technique. The resulting electromagnetic environment will simulate a free field, plane wave environment over a region that is 10 wavelengths long in a single dimension, and located 100 feet to 200 feet from the device. The device is capable of creating an electromagnetic environment that simulates a free field, one dimensional, plane wave arriving at a maximum deviation angle of 2-degrees relative to a line between the device and the object under test.

U.S. Pat. No. 5,247,843 to Bryan, discloses a system and technique for generating an electromagnetic environment such as would be seen by a moving object. The system utilizes a collection of feed horns in combination with a reflector or lens, and a 3 degree of freedom positioner to create an electromagnetic environment that approximates a free field plane wave incident from an arbitrary angle. The device relates to apparatus and method for using compact ranges to simulate electromagnetic environments for computer controlled test systems to measure the electronic response of small (just a few wavelengths in extent) moving objects, i.e., a missile, to a free field plane wave electromagnetic environment.

U.S. Pat. No. 3,719,812 to Bishop, discloses a system and technique for generating a receiver input signal that would be created by a plurality of simultaneously operating radio frequency transmitters having time-varying transmission parameters and having time-varying relative positions with respect to the receiver. The input signal is comprised of a plurality signals, and combined in a circuit to generate the receiver input signal. The disclosed system does not rely on the use of a radiated field.

U.S. Pat. No. 5,339,087 to Minarik, discloses a system and technique for emulating plane wave propagation from multiple transmitting antennas to measure the response of an array processor in both a static and dynamic manner. Different transmitters radiate signals into free space and are coupled to the array processor via a receiving antenna to create a simulated signal by the wavefront simulator. The simulated signal is supplied directly to the electrical circuits. The system does not rely on the use of a radiated field.

U.S. Pat. No. 6,056,780 to Aubry, discloses a method for positioning electromagnetic sensors in an array in order to optimize a certain antenna property. Using a Genetic Algorithm optimizing procedure, the method determines the optimum locations and relative placements of a finite number of antennas for the purpose of maximizing a particular characteristic, like maximizing antenna gain in a particular direction.

U.S. Pat. No. 5,719,794 to Altshuler, discloses a process whereby the design of a wire antenna can be automated and optimized. Given a representation of the solution space (i.e., number of straight wires allowed in the solution) and one or more desired operating characteristics, (i.e., operating bandwidth, gain, direction of maximum antenna gain) the procedure will synthesize an antenna design. The evaluation of a particular candidate antenna design is accomplished by rigorously computing its electrical properties.

None of these devices, however, disclose generating an electromagnetic environment with multiple plane wave-like regions located in multiple, possibly disconnected, user specified positions, and with the capability to produce two, and three dimensional field distributions. In addition, these devices do not teach the use of an arbitrary number of electromagnetic transmitting stations that can be distributed about an object under test, almost arbitrarily. Also, these devices are not configured to produce a near field plane-wave-like electromagnetic environment by the utilization of a Genetic Algorithm.

SUMMARY OF THE INVENTION (DISCLOSURE OF THE INVENTION)

The generation of plane wave electromagnetic environments at RF and electrical frequencies (typically in the 20 MHZ-20 GHz frequency range) for testing the response and behavior of electronic equipment can be difficult, or impossible, within the confines of an anechoic chamber. Disclosed is a unique way to generate pseudo-plane waves in confined environments. Whereas a true plane wave would bathe the region occupied by the electronic equipment with power density and phase that are uniform over an unbounded planar surface, the Pseudo-Plane Wave Generator generates an electromagnetic field that approximates a plane wave field only over limited extents of continuous or discontinuous volumes or regions occupied by the OUT housing electronic equipment.

The Pseudo-Plane Wave Generator is comprised of various control circuits, radiating elements, and an algorithmic procedure utilizing a Genetic Algorithm optimization procedure that determines near-optimum array excitation vectors from specifications (frequency, position, etc.) input to a computer by an operator. The optimization result is then translated by the computer to electrical commands to electrical control circuits that can control the amplitude and phase of electrical signals used to drive radiating antennas. The superposition of the fields radiated by the multiple antennas results in an excellent approximation to the desired electromagnetic environment at the specified physical locations. These specified locations must be in the radiating near field of the transmitting station(s), that is, within a distance of approximately $2D^2/\lambda$, from the transmitter with D the largest overall dimension of the transmitter array or OUT, whichever is larger.

The preferable single transmitting station of the Pseudo-Plane Wave Generator comprises a 16-element transmitting station, with an operating frequency in 20 MHZ-20 GHz range. We select 1 GHz frequency for illustration purposes. The control circuit comprises a means to control amplitude and phase of the radiated circuit. The Pseudo-Plane Wave Generator can include the use of 1 or more transmitting stations, with more or less than 16 elements comprising each transmitting station.

A primary object of the present invention is to provide a capability to measure the electronic circuit responses to an electromagnetic plane wave environment of a large object that is coupled to the exterior environment via distributed, small apertures and/or wire penetrations.

A second object of the present invention is to provide a capability to create an arbitrary electromagnetic environment within a region to measure the electromagnetic response and/or behavior of an object, such as an antenna, placed within the region.

A third object of the present invention is to provide a capability to find the magnitude and phase of each radiating element of the Pseudo-Plane Wave Generator from geometrical information, and by utilizing a Genetic Algorithm to find a near-optimum solution of a complex optimization problem.

A fourth object of the present invention is to provide a capability to create a predefined, desired (often, but not necessarily, planar-like) field distribution over one or more connected or disconnected areas. That is, although the previous discussions have involved creation of plane-wave-like fields to provide a capability for testing in the radiating near field of the transmitting stations, the present invention encompasses the generation of any predefined field distribution.

A fifth object of the present invention is to provide a capability for the generation of any predefined, desired (often, but not necessarily, planar-like) shaped phasefronts and amplitude types for the broad range of wave phenomena that are well characterized by linear superposition principles. These include, but are not limited to, electromagnetic, audio, optical, seismic, and sonar applications.

A primary advantage of the present invention is that it allows the measurement of the electromagnetic response and/or behavior of an electrically large object (extends many wavelengths along its largest dimension) within the confines of volumes where previously such measurements were impossible to make.

A second advantage of the present invention is that it allows the creation of an electromagnetic environment with specific properties needed to conduct a particular measurement.

A third advantage of the present invention is that it is extensible and expandable. The Pseudo-Plane Wave Generator can be easily augmented with additional transmitting stations, providing greater capability and more flexibility in the number of plane-wave-like regions calculated, and an increase in the fidelity of the plane-wave-like properties within their regions.

Where more than one transmitting station comprises the planewave generator, the dimension "D" in $2D^2/\lambda$ is now largest dimension of total system.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

Figure 1A:
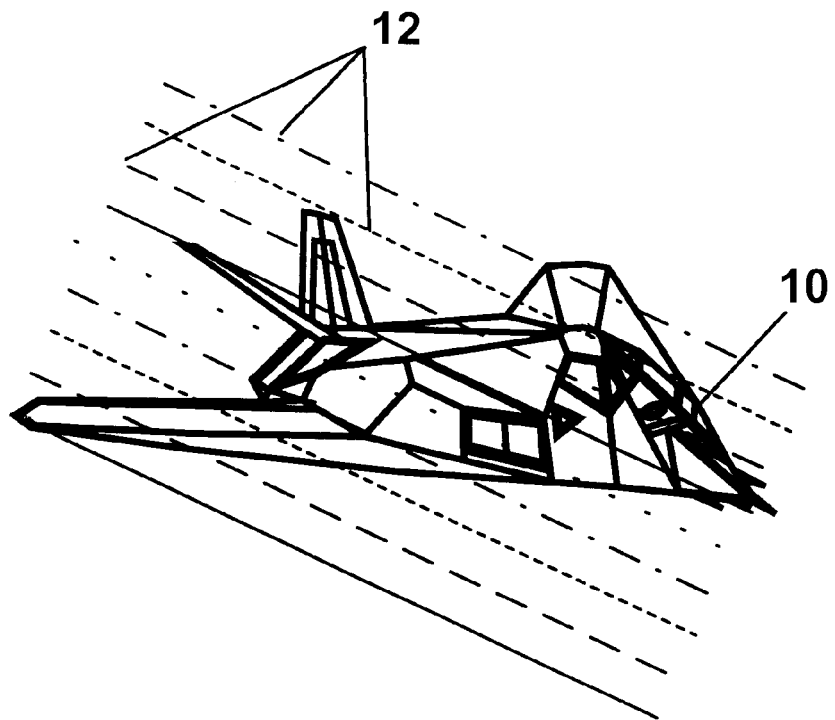
FIG. 1a depicts an object in a free field, plane wave, electromagnetic environment.

DESCRIPTION OF THE PREFERRED EMBODIMENTS (BEST MODES FOR CARRYING OUT THE INVENTION)

In general, the Pseudo-Plane Wave Generator produces a time harmonic electromagnetic environment in either the entire region, or specified subsets, of the OUT. The characteristics of this environment are such that measurements of the behavior of electronic circuits embedded within a large (many wavelengths in size) OUT and coupled in an electromagnetic sense to the exterior via small, relative to OUT size, distributed apertures and/or wire penetrations, can be made. In general one may also wish to create plane wave environments for other reasons than for measurement of the behavior of electronic circuits imbedded in the OUT. For example, the OUT may have one or more antennas that are physically separated, whose response under plane wave irradiation is to be measured. The standard way of making these measurements has been to place the OUT a large distance—the far field—from a radiating antenna. Specifically, the far field distance is greater than $2D^2/\lambda$ where D=is the largest dimension of the radiating antenna or OUT, whichever is larger, and $\lambda$=wavelength at the frequency of operation. For large objects this distance requirement has been prohibitive for some applications. For example, to generate a true plane wave over an aircraft with a wingspan of 9.45 meters, at a test frequency of 1 GHz would require a minimum separation of approximately 595 meters from the transmitting antenna, assuming the transmitting antenna is physically smaller than the wingspan. For many applications coupling measurements must be made within the confines of an anechoic chamber. In these cases true plane wave illumination is impossible to achieve. The present invention addresses this measurement deficiency. If the objective is to measure the response of electronic circuits and/or antennas that are embedded within a large OUT, and these electronic circuits are coupled to the exterior via distributed apertures and/or wire penetrations or other electromagnetically conducting geometries/configurations, then the use of the Pseudo-Plane Wave Generator is applicable.

The Pseudo-Plane Wave Generator creates an electromagnetic plane wave-like environment over one or more small, distributed apertures of an OUT. The OUT is located in the radiating near field of the pseudo plane-wave-generator, at a distance less, possibly much less, than $2D^2/\lambda$ of the pseudo-plane wave generator. The electromagnetic environment produced by the Pseudo-Plane Wave Generator is not a precisely true plane wave; however, it is an accurate approximation over the specified volume Since the response of antennas and/or electronic circuits of the OUT is dictated by coupled or directly received radio frequency (RF) energy, and since the field configurations incident on the apertures, wires, and/or antennas closely approximate exact plane waves over the specified volumes or areas, the electromagnetic fields of the Pseudo-Plane Wave Generator produce a circuit or antenna response of the OUT approximately equivalent to that due to a true plane wave electromagnetic environment. The measurement of electromagnetic field coupling via multiple (relative to the overall size of the OUT) small distributed apertures into the interior of an OUT can also be accomplished with the Pseudo-Plane Wave Generator, as shown schematically in FIG. 1b. The preferred pseudo-plane wave electromagnetic environment and a true, plane wave electromagnetic environment are illustrated in FIGS. 1b and 1a, respectively.

Figure 1B:
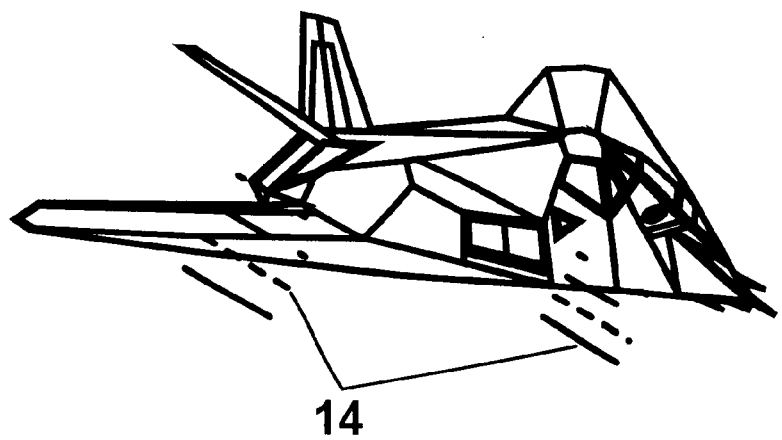
FIG. 1b depicts a pseudo-plane wave electromagnetic environment.

FIG. 1a shows an object 10 in a free field, plane wave, electromagnetic environment. Note that the plane wave is incident over the entire object. A plane wave 12 is one that propagates without attenuation, has components of electric and magnetic field only in a plane perpendicular to the direction of propagation, has orthogonal components of electric and magnetic field in a particular plane perpendicular to the direction of propagation at a given instant in time, and has a phase relationship among field components in different planes, at a given instant in time, that vary as the ratio of the distance between the planes and the wavelength. True plane wave 12 fields are produced by transmitting structures located many wavelengths from an observation point or object location, and the characteristics of the plane wave 12 field are uniform and simply related over the extent of the object as described above. FIG. 1b depicts a pseudo-plane wave electromagnetic environment. Note that the pseudo-plane wave is incident over only two disconnected areas of the object.

Plane wave-like regions 14 are shown to exist over just local, potentially discontinuous, regions of the object 10. The pseudo-plane wave environment is created by the Pseudo-Plane Wave Generator and produced by transmitting structures located just a few wavelengths from the OUT 10. The objective is to create a complex electromagnetic environment with plane wave like characteristics over limited extents of the volume occupied by the OUT 10. The electromagnetic field in regions other than these, a priori specified limited extents, assumes whatever value is needed to satisfy the fundamental equations governing the behavior of electromagnetic fields. Since the electronics of the object under test 10 are coupled to the electromagnetic field produced by the Pseudo-Plane Wave Generator, the response of these electronic circuits will mimic the response to a true plane wave electromagnetic environment. The test object 10 is located in the near field of the transmitting radiators of the Pseudo-Plane Wave Generator, and consequently the electric and magnetic components of the electromagnetic environment over the full extent of the object share a complex relationship, generally not plane-wave-like, taken as a whole. However, over the pre-selected volumes, such as shown conceptually in FIG. 1b, a good approximation to a plane-wave is created.

The Pseudo-Plane Wave Generator comprises electrical circuits, radiating antennas, a controlling computer, and a software program that utilizes a Genetic Algorithm optimization procedure to determine near-optimum array excitation vectors from specifications input to the computer by an operator. These specifications include identification of the operating frequency, locations and relative positioning of the OUT and its small distributed aperture(s) relative to the transmitting stations, and the locations, number and configuration of one or more transmitting stations.

The electrical circuits of the Pseudo-Plane Wave Generator are collected in groups of one or more transmitting stations. Each transmitting station is composed of an array of radiating antennas, with each antenna associated with a unique electrical and electromagnetic circuit channel typical of that indicated in FIG. 2.

Figure 2:
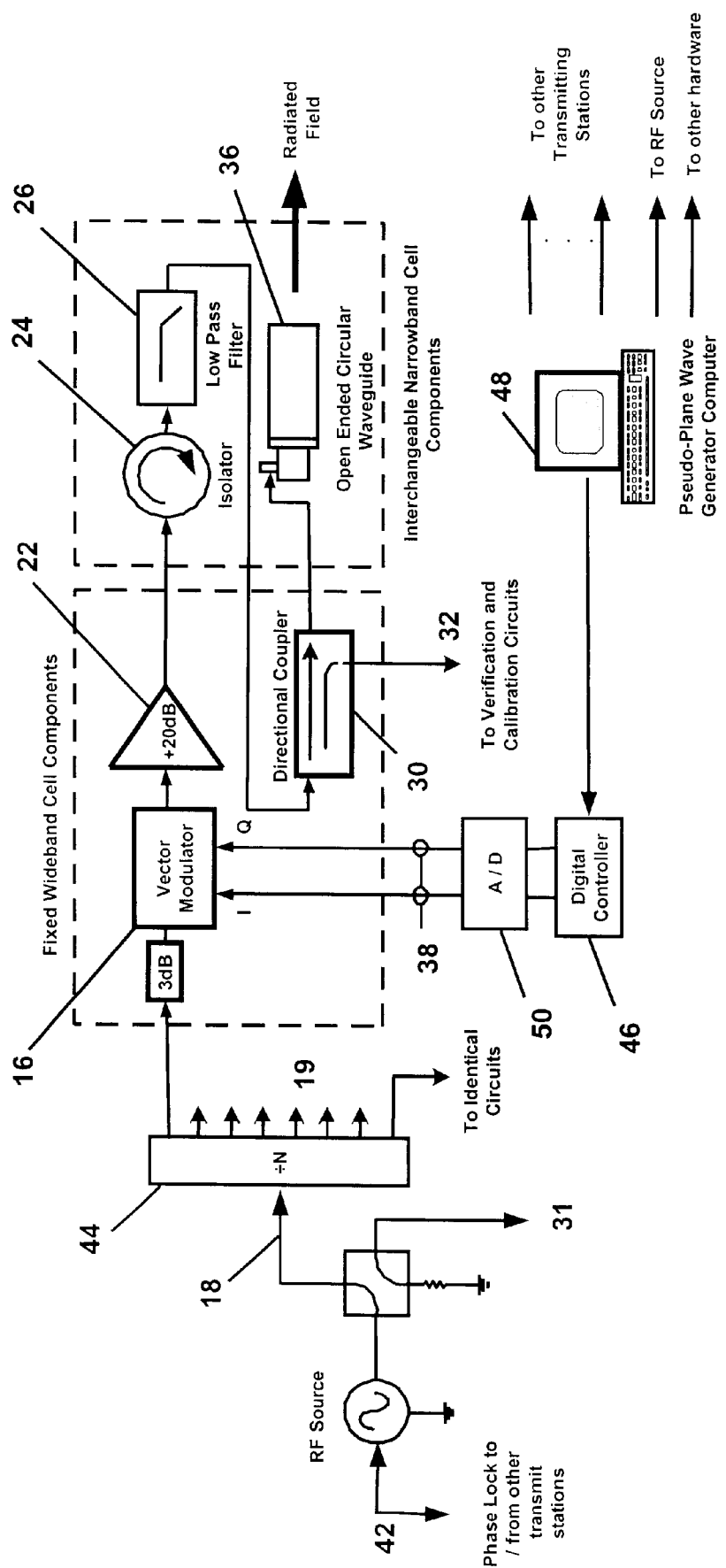
FIG. 2 is a flow diagram depicting the sequence of operations performed by the Plane Wave Generator to produce a complex electromagnetic environment with limited regions of plane wave-like character.

The fundamental hardware and electrical control circuits for 1 radiating element of an N-element transmitting station of the Pseudo-Plane Wave Generator is depicted in FIG. 2. Electromagnetic signal 18 is first divided by N, where N is the number of radiating elements of the particular transmitting station 20. The divided signal is then routed to a vector modulator 16 that adjusts appropriately the amplitude and phase of the signal 18. The signal next is amplified 22 (if required), and passes though isolator 24, which serves to isolate the vector modulator 16 from signal reflections at radiating antenna 28. A low pass filter circuit 26 is used to remove any spurious or harmonic frequency components generated by non-linear processes in the vector modulator or amplifier 16. The signal next passes through a directional coupler 30 that removes a small portion of the forward propagating (toward the radiating element) signal for purposes of calibration and verification procedures 32. Finally, the signal is transmitted via an antenna. In the preferred embodiment the antenna is an open-ended circular waveguide 36. Open ended circular waveguide 36, including possibly a conical horn antenna is a preferred antenna since it can be driven in the fundamental $TE_{11}$ mode, at two orthogonal locations about its enclosure, to produce either sense of linear polarization, or circular polarization if used in conjunction with an orthomode feed. Clearly, other antenna types well known in the art would also be feasible. Also shown are those components that can be removed, and replaced with components suitable for other frequency bands. Replaceable components include the radiating antenna 36, isolator 24 and low pass filter 26. By implementing the Pseudo-Plane Wave Generator in the modular fashion shown, a great cost savings can be realized by the sharing of expensive multiple octave bandwidth electromagnetic components across frequency bands.

FIG. 2 shows a typical circuit for controlling the amplitude and phase of the signal that is applied to the terminals of the transmitting antenna. The signal processing of the input RF signal is as follows: An electromagnetic signal 18, phase referenced with a master oscillator and phase locked with the input signals of all other channels of all other transmitting stations 42, is supplied to the input terminals of the transmitting station. This signal 18 is divided evenly among the number of channels 44 of the transmitting station. After buffering (and possible amplification) the signal is amplitude adjusted and phase shifted by a vector modulator 16. Vector modulator 16 is controlled by a pair of analog signal lines 38. The analog signal lines are excited by the output of an analog to digital converter 50, whose input is a binary word, typically 15 bits per analog line. The binary word is supplied by digital controller 46 (specific to a single transmitting station), that is in turn, controlled by the Pseudo-Plane Wave Generator Computer 48. The number of channels per transmitting station is limited only by space and cost considerations. The apparatus is not limited by a maximum number of radiating channels per transmitting station.

Figure 3:
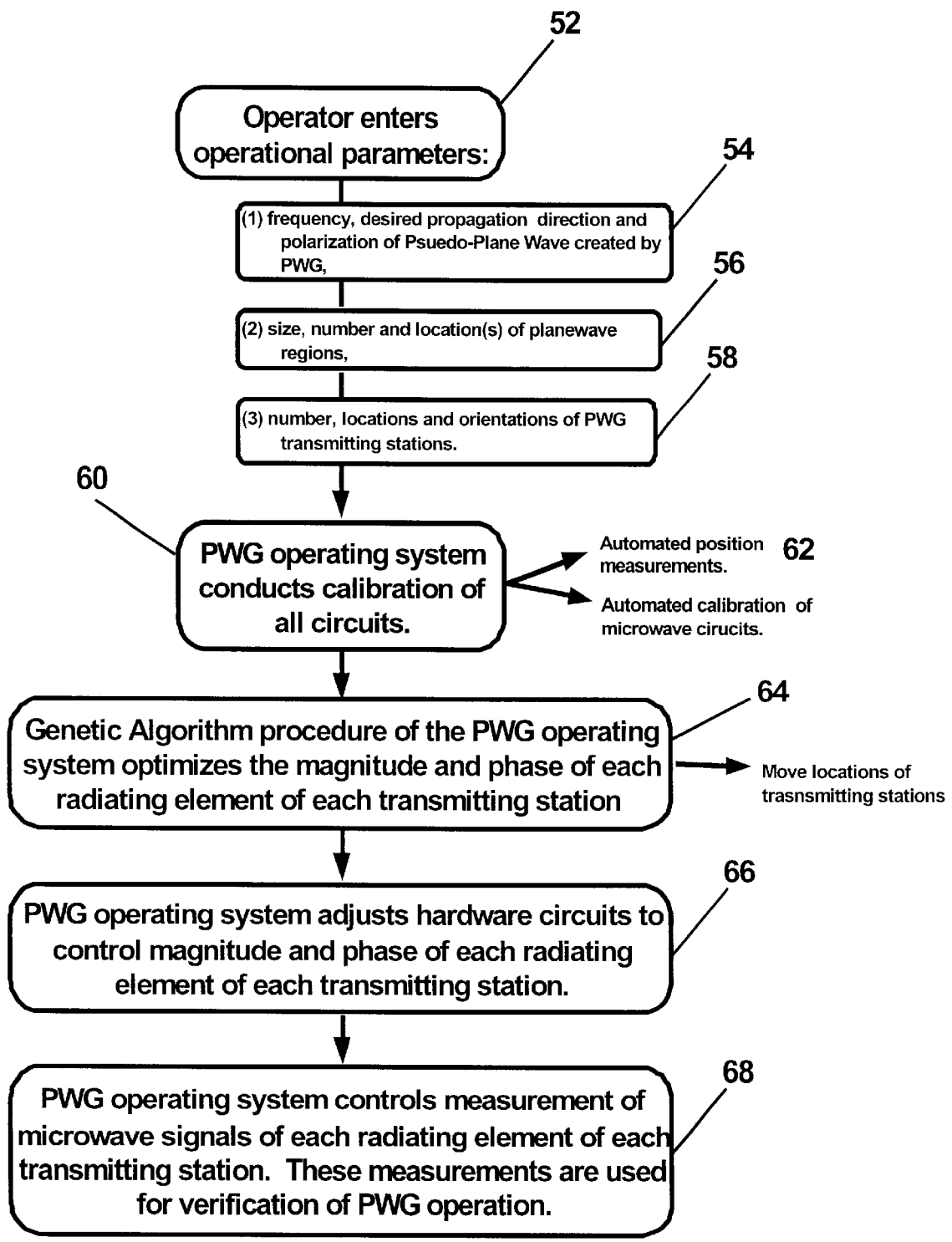
FIG. 3 shows one possible configuration for fundamental hardware and electromagnetic control circuits for 1 radiating element of an N-element transmitting station of the Pseudo-Plane Wave Generator.

The flow diagram depicting the sequence of operations performed by the Plane Wave Generator to produce a complex electromagnetic environment with limited regions of plane wave-like character is shown in FIG. 3. To begin, an operator enters operational parameters 52, via keyboard entry, to the Plane Wave Generator system software program that runs on a control computer. These operational parameters include specification of the operating frequency, and the desired apparent propagation direction and polarization of pseudo-plane wave(s) created by the Pseudo-Plane Wave Generator 54. It also includes the size, number and location (s) of desired plane wave regions 56, and the number, locations and orientations of the transmitting stations of the Plane Wave Generator 58. Next, the operating system software program controls and possibly, though not necessarily, conducts calibration of all electronic circuits 60. This can include automated measurement of the distance relationships among the components of the Plane Wave Generator 62 and the desired local regions about the object under test where plane wave-like character is desired. Following, the operating system software program conducts an optimization based on a Genetic Algorithm procedure 64. The optimization seeks the optimum combination of magnitude and phase of the excitation signal of each radiating element of each transmitting station of the Plane Wave Generator. After an optimum, or near optimum solution is found the operating system software adjusts and controls hardware circuits to control the magnitude and phase of each radiating element of each transmitting station 66. Finally, the operating system software controls and conducts measurement of electromagnetic signals of each radiating element of each transmitting station 68. These measurements are used for verification of Pseudo-Plane Wave Generator operation.

As previously described in the system flow diagram of FIG. 3, after user entry of operating parameters the Pseudo-Plane Wave Generator performs an automated calibration and verification of its operational status. This is accomplished via automated measurements of the signals of the device at certain key locations 31, 32 as indicated in FIG. 3. Next, the Pseudo-Plane Wave Generator system software conducts a search for an excitation vector (comprised of the amplitude and phase of each transmitting channel of each transmitting station) that will produce the desired "local" plane wave-like behavior over the designated area(s). This search is accomplished via a Genetic Algorithm procedure 64. Briefly a Genetic Algorithm finds a local optimum to a problem. First, a representation of all potential solutions is accomplished. For the preferred embodiment, the representation of the magnitude and phase of each radiating element is discretized as a 16-bit binary word, for a total of 32-bits per radiating element. An initial population, consisting of amplitude and phase values for all radiating elements, is formed randomly. The field radiated by each radiating element is then computed via a rigorous numerical electromagnetic model of the radiator. The numerical electromagnetic model of the radiator depends on the type of radiator. For example, the field radiated by a wire antenna is computed by the Method of Moments technique, other antenna types are modeled appropriately. The Pseudo-Plane Wave Generator system software then combines the computed fields of all radiators to form a calculation of the total field produced by the Pseudo-Plane Wave Generator. A quantitative measure of the fitness of this field is then made by the Pseudo-Plane Wave Generator software, using the following relationships:

$$T(\vec{r}; \vec{r}_{ref}) = 1 - \frac{|\overline{E}(\vec{r}) - \tilde{E}(\vec{r}; \vec{r}_{ref})|}{|\tilde{E}(\vec{r}; \vec{r}_{ref})| + |\overline{E}(\vec{r})|} \quad (1)$$

Figure 4:
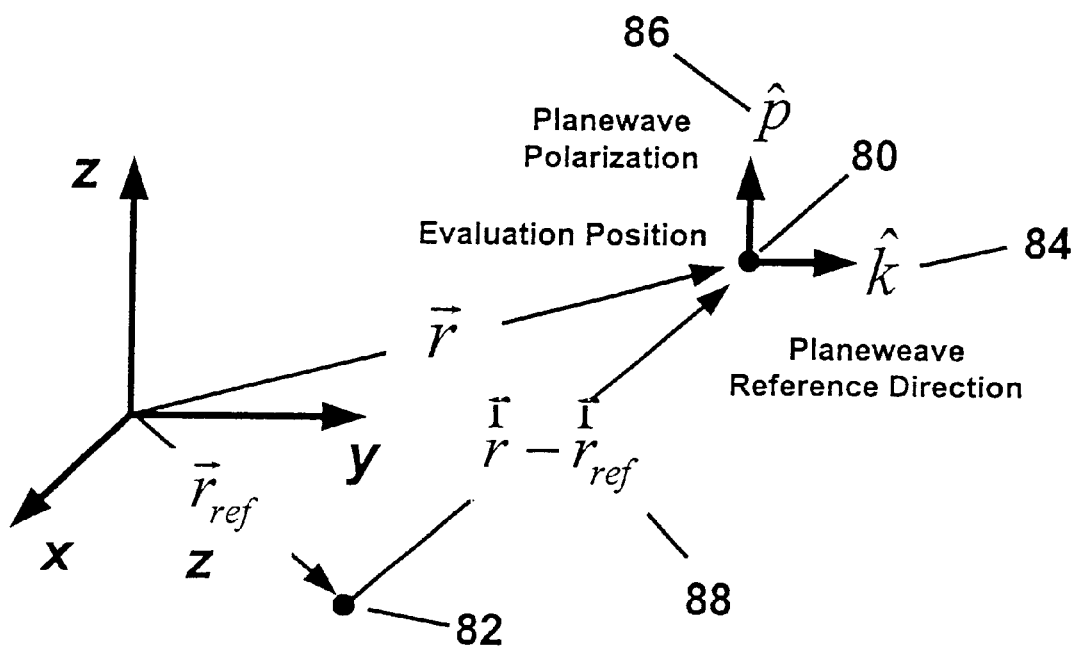
FIG. 4 shows the geometry and variables associated with the different field quantities used by the Genetic Algorithm to compute the fitness of a potential candidate solution.

Called the T-factor, this measure is accomplished by first selecting a reference field as $$\tilde{E}(\vec{r}; \vec{r}_{ref}) = \{[(\hat{k} \times \vec{E}(\vec{r}_{ref})) \times \hat{k}] \Box \hat{p}\} \hat{p} e^{-jk\Box(\vec{r}-\vec{r}_{ref})} \quad (2)$$

where $\tilde{E}(\vec{r}; \vec{r}_{ref})$=value of reference field at the evaluation position 80; $\tilde{E}(\vec{r}_{ref})$ value of reference field at the reference position 82; $\overline{E}(\vec{r}_{ref})$=true value of field at the reference position; and $\overline{E}(\vec{r})$=true value of field at the evaluation position. The other variables are as indicated in FIG. 4. Note that other definitions of the T-factor are possible depending on the important field or wave property. For example, for some applications it is just the phase of the field over the desired and distributed plane wave regions that is important, and an alternative definition would emphasize this aspect. This would be the case for sonar applications, for example; for electromagnetic applications in which non-planar excitation was desired, yet another definition of T-factor would be utilized. The definition of T-factor used here relates to the preferred embodiment. Note that the Genetic Algorithm procedure seeks a combination of array excitation amplitude and phase, which maximizes the value of T.

In FIG. 4 the geometry and variables associated with the different field quantities used by the Genetic Algorithm to compute the fitness (T-factor, as in Equation (1)) of a potential candidate solution are shown. Quantities indicated include the vector distance from the global origin to a location where plane wave properties are desired $(\vec{r})$ 80; the vector distance from the global origin to a reference location 82 where the reference plane wave is specified $\vec{r}_{ref}$; the vector distance between the reference location and the location where plane wave properties are desired $(\vec{r}-\vec{r})$ 88; the desired plane wave propagation direction ($\hat{k}$) 84 and the desired plane wave polarization ($\hat{p}$) 86.

Figure 5:
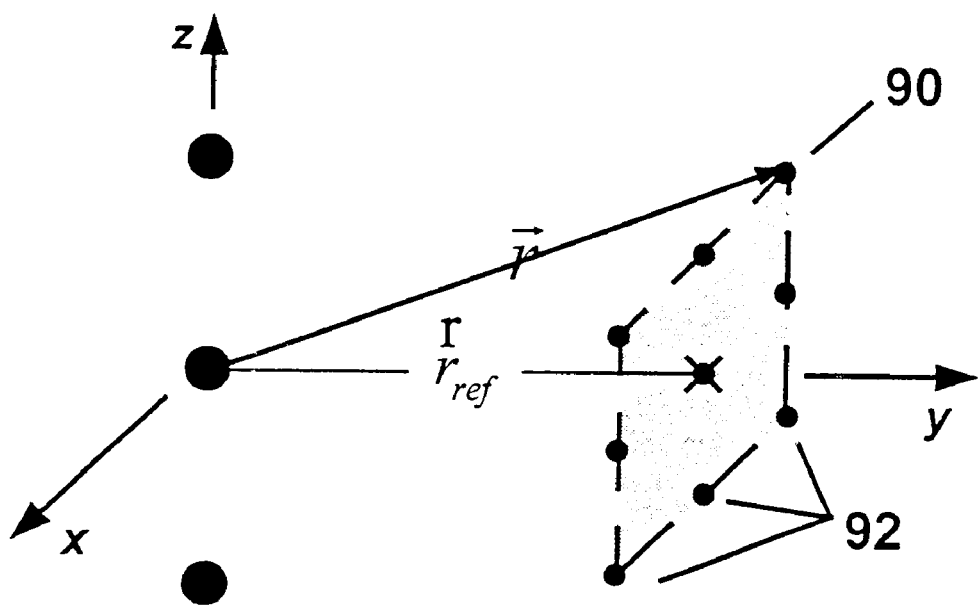
FIG. 5 shows the geometry and variables associated with the computation of the T-factor and fitness of a potential candidate solution by the Genetic Algorithm.

This value of fitness is computed at a single point 90, or at many points over the user specified plane wave region 92, or regions, as illustrated in FIG. 5. The geometry and variables associated with the computation of the T-factor and fitness of a potential candidate solution by the Genetic Algorithm are shown in FIG. 4 and FIG. 5. This value of fitness is computed at many points over the user specified plane wave region(s). The weighted sum of these values comprises the fitness of a potential solution. After computing the fitness of all potential solutions in the first generation, the Genetic Algorithm forms a next generation population based on characteristics of the current population. This process repeats until a candidate solution is found for which the radiated field meets a threshold value, i.e., the field it produces is sufficiently close to the desired plane wave-like field specified by the user. A second terminating condition for the Genetic Algorithm is the number of generations; beyond a maximum number the procedure halts and returns the best solution discovered during the search. It is a property of the genetic algorithm that the best solution discovered is not necessarily the best in a global sense; however, it is an acceptable solution based on user-defined criteria and intrinsic limitations imposed by the immutable laws of electromagnetics.

Once the Genetic Algorithm optimization is complete, this result is translated by the computer to electrical commands to electrical control circuits that can control the amplitude and phase of electrical signals which are used to drive radiating antennas of each transmitting station. The superposition of the fields radiated by the multiple antennas results in the desired electromagnetic environment at the specified physical locations. These specified locations must be in the radiating near field of the transmitting station(s).

Although the preferred embodiment describes using a Genetic Algorithm there are several well known alternative optimization techniques that can be utilized. The Genetic Algorithm is a search-based optimization algorithm based on the mechanics of natural selection and genetics. There are other types of known optimization techniques identified in current literature. The three main types of search methods are: calculus-based, enumerative, and random. This disclosure is not meant to limit the optimization method, therefore included in this disclosure is any optimization technique to find the amplitude and phase vector associated with the radiating antennas. The Genetic Algorithm is just one of the many types of search/optimization techniques commonly employed to locate preferred operating points of large systems. It is the preferred embodiment because it has been shown to exhibit the desirable property of robustness, which is a balance between efficiency and efficacy.

Other well known optimization techniques include: the method of Simulated Annealing; the method of Least Squares; the method of Successive Approximation; and the Predictor-Corrector procedure.

The use of Genetic Algorithm optimization is not a unique aspect or element of the PWG invention. As explained above, any optimization technique could be employed. It may be the case that the Genetic Algorithm is well suited for this application, but it is not the only way to realize the properties of the PWG. Another implementation of the PWG that is identical in all respects, except for the type of optimization technique employed, would fundamentally be the same apparatus and method.

Figure 6:
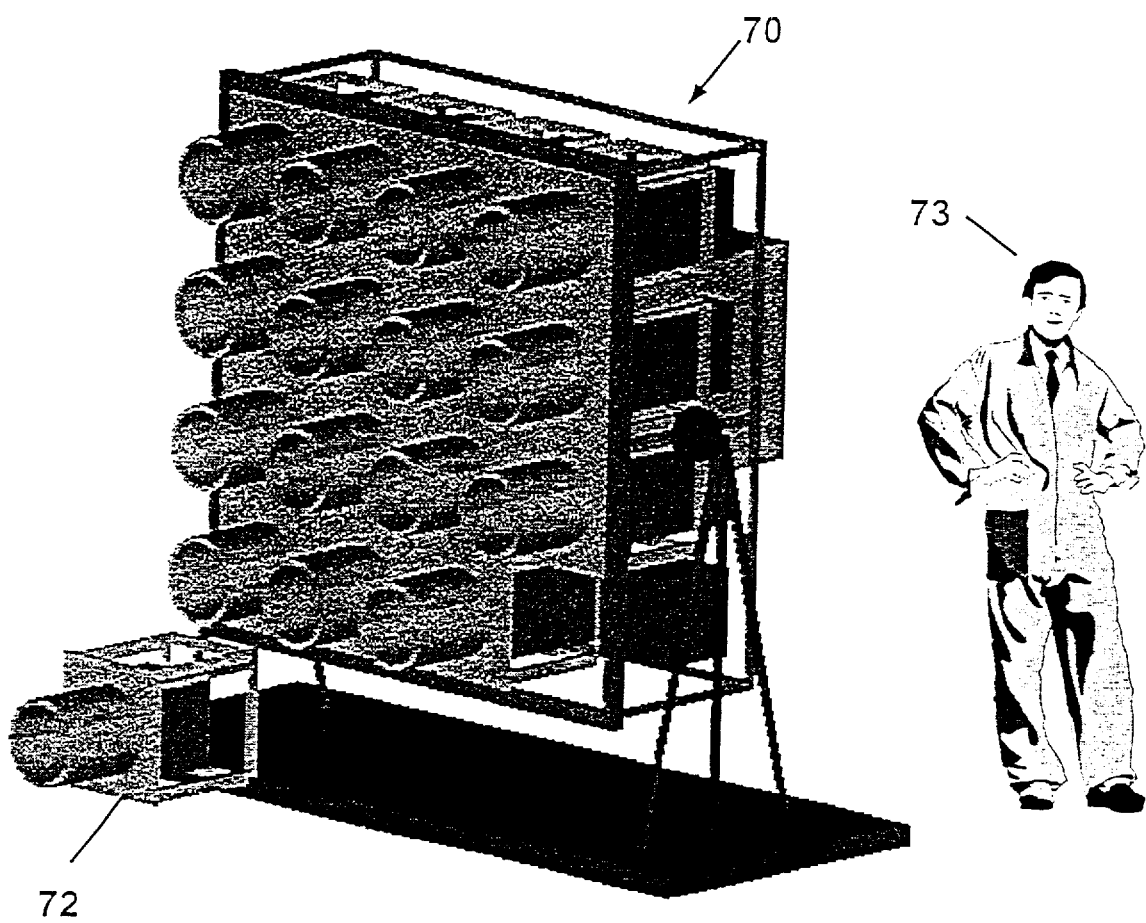
FIG. 6 shows an artist's concept for a possible configuration for a single transmitting station of the Pseudo-Plane wave Generator as a 16-element array.

An artist's conception of a transmitting station of the Pseudo-Plane Wave Generator is shown in FIG. 6. A single transmitting station of the Pseudo-Plane Wave Generator is depicted as a 16-element array 70. For the scale lengths indicated, a human 73 is shown next to the transmitting station, the operating frequency is L-band (1 GHz). Each of the radiating antennas 72 are shown as modular and can be replaced by other radiators that operate over different frequency regimes. In general, the Pseudo-Plane Wave Generator can be comprised of more than one transmitting station (not shown). The control circuits are located behind the modular antennas, and connection is made to the control computer via standard means (not shown).

Figure 7:
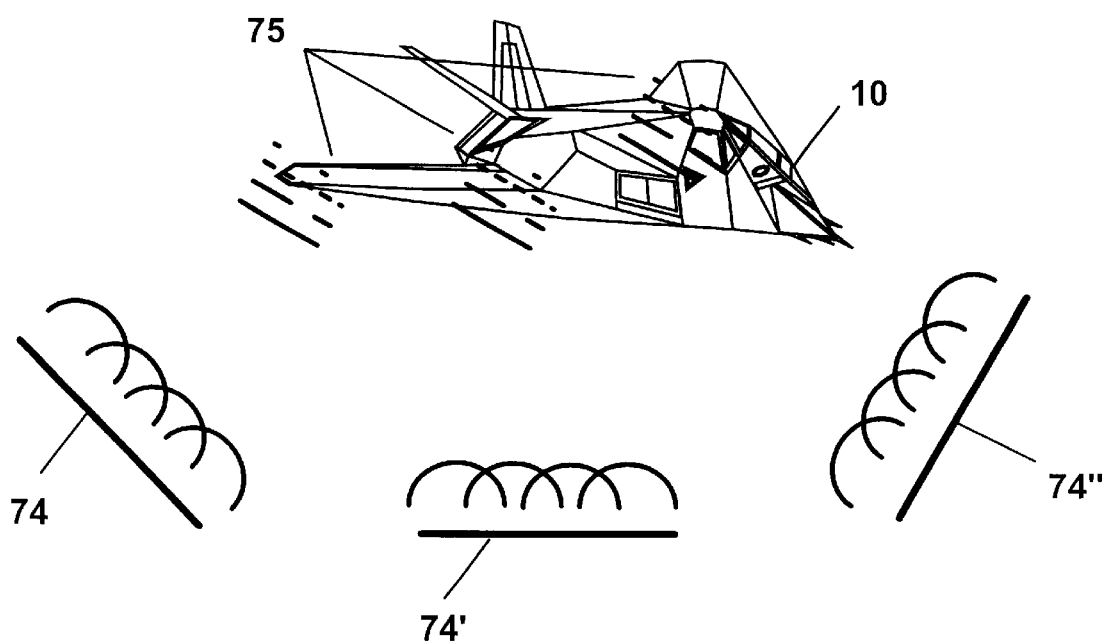
FIG. 7 shows a Pseudo-Plane Wave Generator comprised of three transmitting stations illuminating an electrically large object.

A Pseudo-Plane Wave Generator comprised of three transmitting stations is depicted in FIG. 7. Each station is an array of electromagnetic radiators with associated electromagnetic circuits and control systems. The object under test 10 is positioned in the radiating near field of the transmitting stations 74, 74', and 74" of the Plane Wave Generator. The superposition of fields radiated by the Plane Wave Generator create an electromagnetic environment that is "plane wave-like" 75 over one or more regions of the object under test 10. Not shown in FIG. 7 is the computer that executes the operating system software, or the physical connections among the computer, RF signal source and transmitting stations. Each station is an array of electromagnetic radiators, connected to other transmit stations via digital computer links and electrical signal transmission lines. After user input of operating parameters and desired field quantities, the Pseudo-Plane Wave Generator apparatus then creates an electromagnetic environment that couples to sensors through small apertures distributed about the object under test, and causes the response of the electronic systems of the object under test to mimic their response to a true free field, plane wave environment.

Note that the phasefront of the electromagnetic plane wave could in principle change with time, by virtue of the time changing excitation vector (amplitude and phase) for the various elements. In this way, the system could simulate physical motion of the OUT relative to a fictitious transmitter, i.e., flight of OUT relative to a nearby transmitter, such as a missile or the like.

What is claimed is:

1. A method of creating a response in an object subjected to a user defined field distribution created by a wavefront generator wherein a distance and orientation between a transmitting array and the object are predetermined and the distance lies within a near field of the transmitter array, the method comprising:

transmitting at a frequency at a first amplitude, a first phase and a first polarization from a first transmitter;

transmitting at the frequency at a second amplitude, a second phase and a second polarization from second transmitter;

transmitting at the frequency at a next amplitude, at a next phase and a next polarization from a next transmitter, wherein the first, second and next transmitters comprise the transmitter array; and determining an excitation vector comprising the amplitudes, phases and polarizations of the first, second and n transmitters using an optimization technique.

2. The method of claim 1 wherein the user defined field distribution comprises an electromagnetic field distribution.

3. The method of claim 2 wherein said user defined field distribution comprises a member from the group consisting of optical, infrared, ultraviolet and x-ray.

4. The method of claim 1 wherein the user defined field distribution comprises a scalar pressure field distribution.

5. The method of claim 4 wherein the scalar pressure field distribution comprises a member from the group consisting of audio, sonar and seismic.

6. The method of claim 1 wherein the user defined field distribution comprises a member from the group consisting of scalar and vector fields in a medium.

7. The method of claim 1 wherein the user defined field distribution comprises a standing wave.

8. The method of claim 1 wherein the user defined field distribution comprises a traveling wave.

9. The method of claim 1 wherein the optimization technique comprises a member from the group consisting of calculus-based, enumerative and random search techniques.

10. The method of claim 1 wherein the object comprises an antenna.

11. A system for creating responses in an object subjected to a user defined electromagnetic field distribution from a transmitter array wherein a distance and orientation between the transmitter array and the object are predetermined and the distance lies within a near field of the transmitter array, the system comprising:

a first transmitter that transmits at a frequency at a first amplitude, a first phase and a first polarization;

a second transmitter that transmits at said frequency at a second amplitude, a second phase and a second polarization;

a next transmitter that transmits said frequency at a next amplitude, at a next phase and a next polarization; and a means to determine an excitation vector comprising said first, second and next amplitudes, said first, second and next phases and said first, second and next polarizations of said first, second and next transmitters using an optimization technique.

12. The invention of claim 11 wherein said user defined field distribution comprises an electromagnetic field distribution.

13. The invention of claim 12 wherein said electromagnetic field distribution comprises a member from the group consisting of optical, infrared, ultraviolet and x-ray.

14. The invention of claim 11 wherein said user defined field distribution comprises a scalar pressure field distribution.

15. The invention of claim 14 wherein said scalar pressure field distribution comprises a member from the group consisting of audio, sonar and seismic.

16. The invention of claim 11 wherein the user defined field distribution comprises a member from the group consisting of scalar and vector fields in a medium.

17. The invention of claim 11 wherein said user defined field distribution comprises a standing wave.

18. The invention of claim 11 wherein said user defined field distribution comprises a traveling wave.

19. The invention of claim 11 wherein the optimization technique comprises a member from the group consisting of calculus-based, enumerative and random techniques.

20. The invention of claim 11 further comprising more than one transmitter array.

* * * * *